Oct. 26, 1965     J. MARTIN     3,214,118
AIRCRAFT EJECTION SEATS
Filed Feb. 13, 1964     6 Sheets-Sheet 4
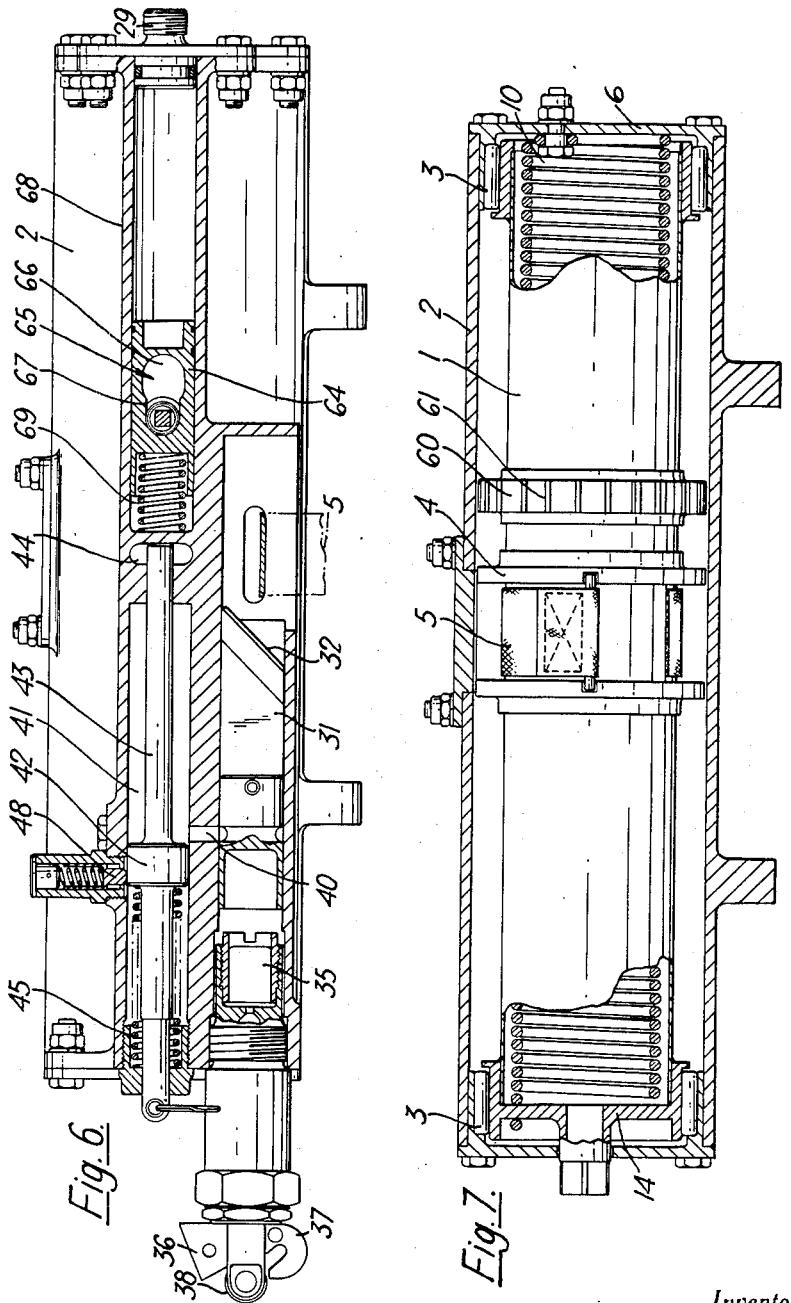
Inventor
JAMES MARTIN
By Oct. 26, 1965   J. MARTIN   3,214,118
AIRCRAFT EJECTION SEATS
Filed Feb. 13, 1964   6 Sheets-Sheet 5

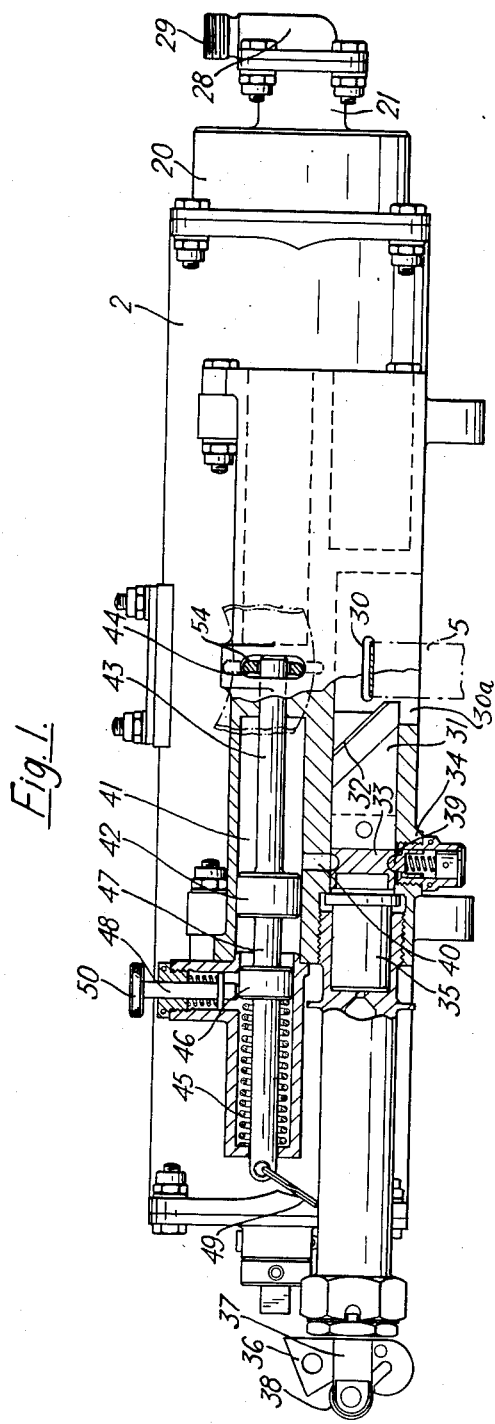

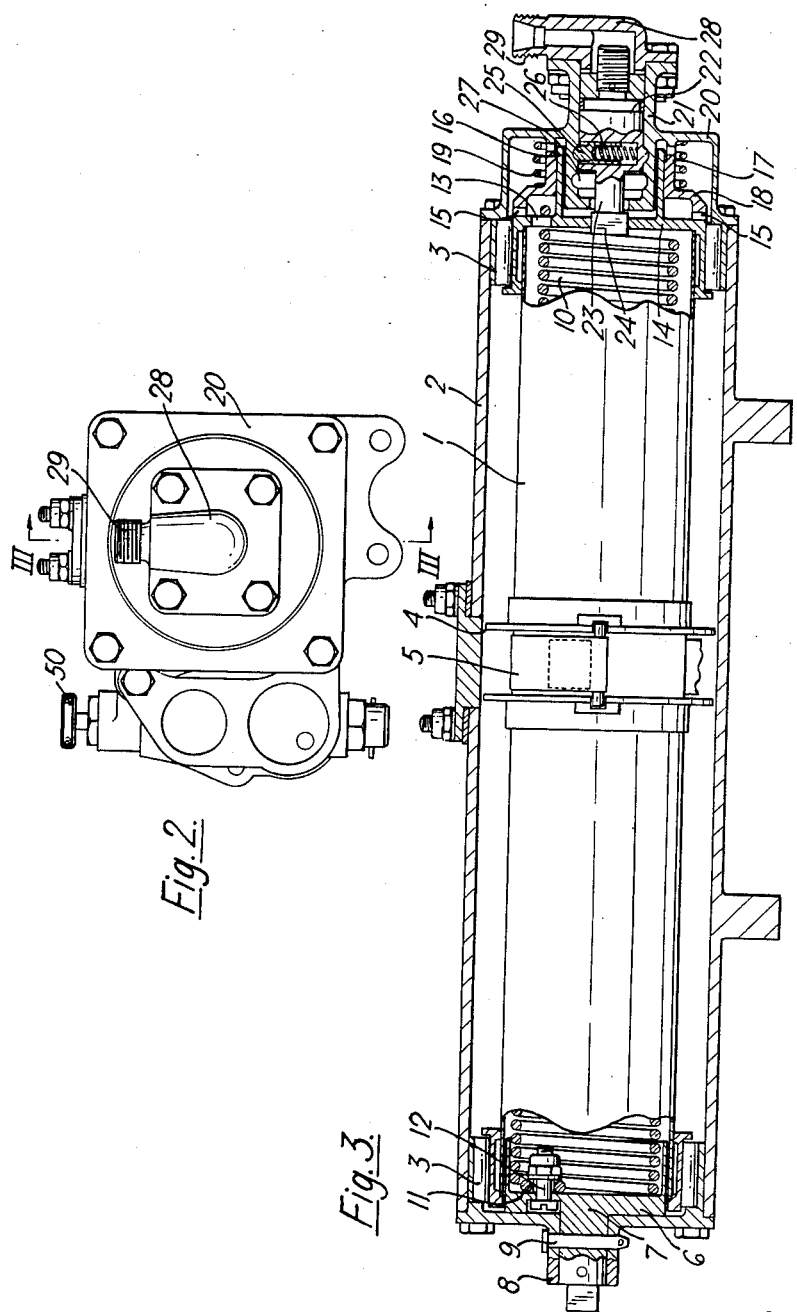

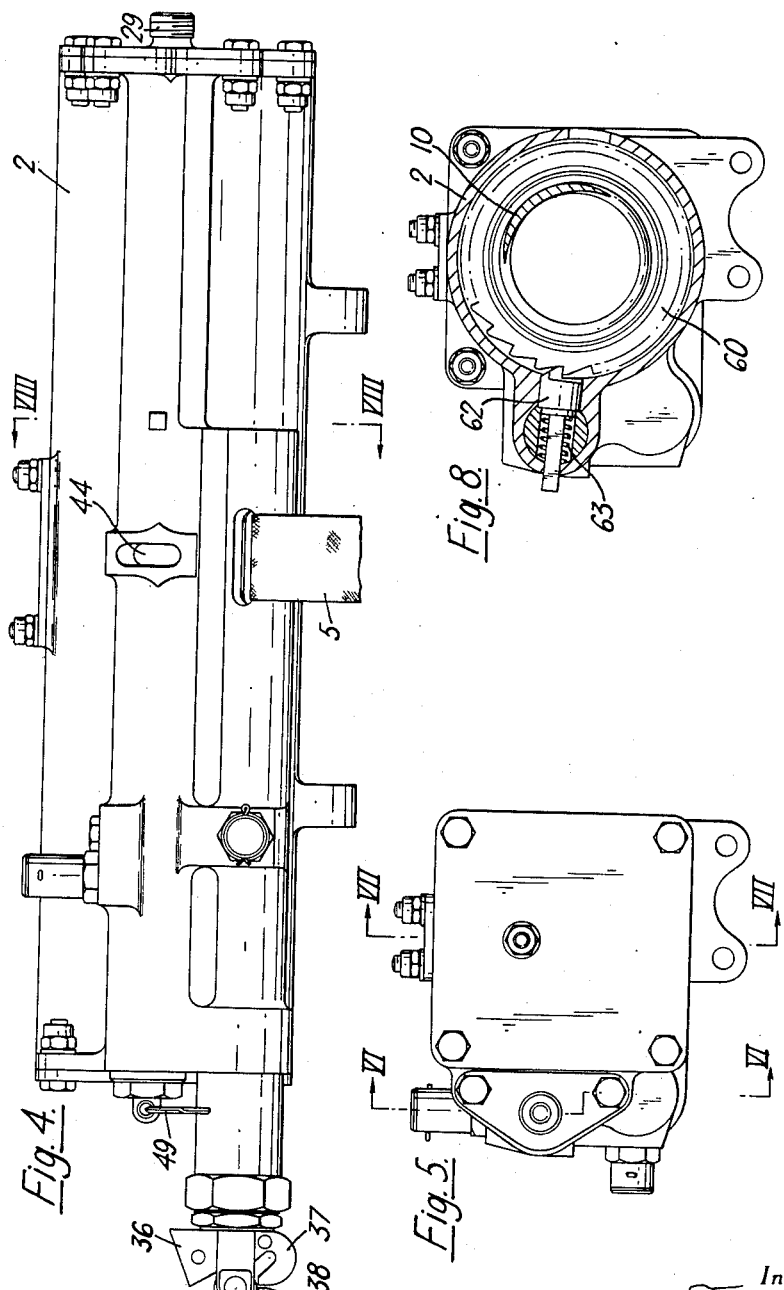

Inventor
JAMES MARTIN
By

United States Patent Office 3,214,118
Patented Oct. 26, 1965

3,214,118
AIRCRAFT EJECTION SEATS
James Martin, Southlands Manor, Southlands Road,
Denham, near Uxbridge, England
Filed Feb. 13, 1964, Ser. No. 344,612
Claims priority, application Great Britain, Mar. 20, 1963,
10,973/63
2 Claims. (Cl. 244—122)

This invention relates to ejection seats for aircraft.

During ejection from an aircraft flying at high speed considerable forces are applied to the ejection seat and to an airman seated therein, both by the process of ejection and by the high speed air stream into which the seat is injected upon ejection.

To deal with the forces applied to the airman during and after ejection, various means have been devised directed towards restraint of the airman's body, legs, feet and arms and protection and restraint of the airman's head has been accomplished by the use of a face blind or screen as described, for example, in Patent No. 2,467,763.

It has been found, however, that it may be necessary in some circumstances to apply more positive restraint to the airman's head than is afforded by such a blind or screen, and it is therefore a principal object of this invention to provide means which, upon initiation of the seat ejection sequence, will automatically locate, restrain and stabilize the airman's head in a predetermined position, thus ensuring that the airman's spine is in the best position to withstand the acceleration produced by the ejection gun and to prevent his head from being jerked forwards and downwards on to his chest as a result of the forwardly offset position of the centre of gravity of the head relatively to the spine. It will be appreciated that this effect is even more pronounced when the pilot is wearing a pressure helmet, since such a helmet may weight four or more pounds, which at an acceleration of 15 g will be equivalent to 60-lbs. weight.

It will be understood that clothing and equipment worn by the pilot is equally as prone to displacement and damage as is the airman's body and that, in the case of the oxygen mask, any such displacement could have serious effects, particularly after ejection at high altitude.

Thus, according to this invention, there is provided airman's head-restraining equipment for an aircraft ejection seat including a head rest, comprising: a retraction mechanism adapted to be mounted on the seat; a flexible member adapted to connect said mechanism to the head of an airman in said seat; said retraction mechanism being operative to apply tension to said flexible member to draw the airman's head against said head rest; and means operative subsequently to operation of said retraction mechanism for disabling the connection between the retraction mechanism and the seat occupant's head.

Preferably said retraction mechanism may comprise a reel for said flexible member and means for rotating said reel in a sense to tension said flexible member.

Conveniently, and in accordance with another feature of the invention said means for rotating said reel may comprise a pre-tensioned torsion spring, said reel being restrained from rotation by said spring by locking means.

According to another feature of the invention, said locking means may comprise a projection adapted to engage said reel.

Conveniently said locking means may comprise a polygonal projection adapted to enter a mating polygonal aperture on the axis of rotation of said reel.

Desirably ratchet means may be provided which cooperate with said reel, or an associated part thereof, to prevent rotation of said reel in opposition to said spring.

According to yet a further feature of this invention, said ratchet means may comprise a ratchet wheel and a co-operating detent, movement of said detent conveniently being restrained by locking means.

Preferably said locking means may comprise a barrier co-operating with said detent, and a reciprocable piston for withdrawing said barrier to release said detent thereby permitting the latter to ride on said ratchet wheel.

According to yet a further feature of this invention means may be provided for unlocking a parachute pack restraining strap locking device, said means preferably comprising a rod carried by a piston, said piston being adapted to be moved in a restraining strap releasing direction by pressure fluid.

If desired, means may be provided for severing said flexible member.

Further features of this invention will become apparent from the following description of three embodiments of head-restraining equipment in accordance with the invention and illustrated, by way of example, in the accompanying drawings in which:

FIGURE 1 is a partially sectioned front view of a presently preferred embodiment of the invention;

FIGURE 2 is an end elevation of the embodiment of FIGURE 1;

FIGURE 3 is a part section on the line III—III of FIGURE 1;

FIGURE 4 is a front view of a second embodiment of the invention;

FIGURE 5 is an end elevation of the embodiment of FIGURE 4;

FIGURE 6 is a section on the line VI—VI of FIGURE 5;

FIGURE 7 is a part section on the line VII—VII of FIGURE 5;

FIGURE 8 is a section on the line VIII—VIII of FIGURE 4;

Figures 9, 10:
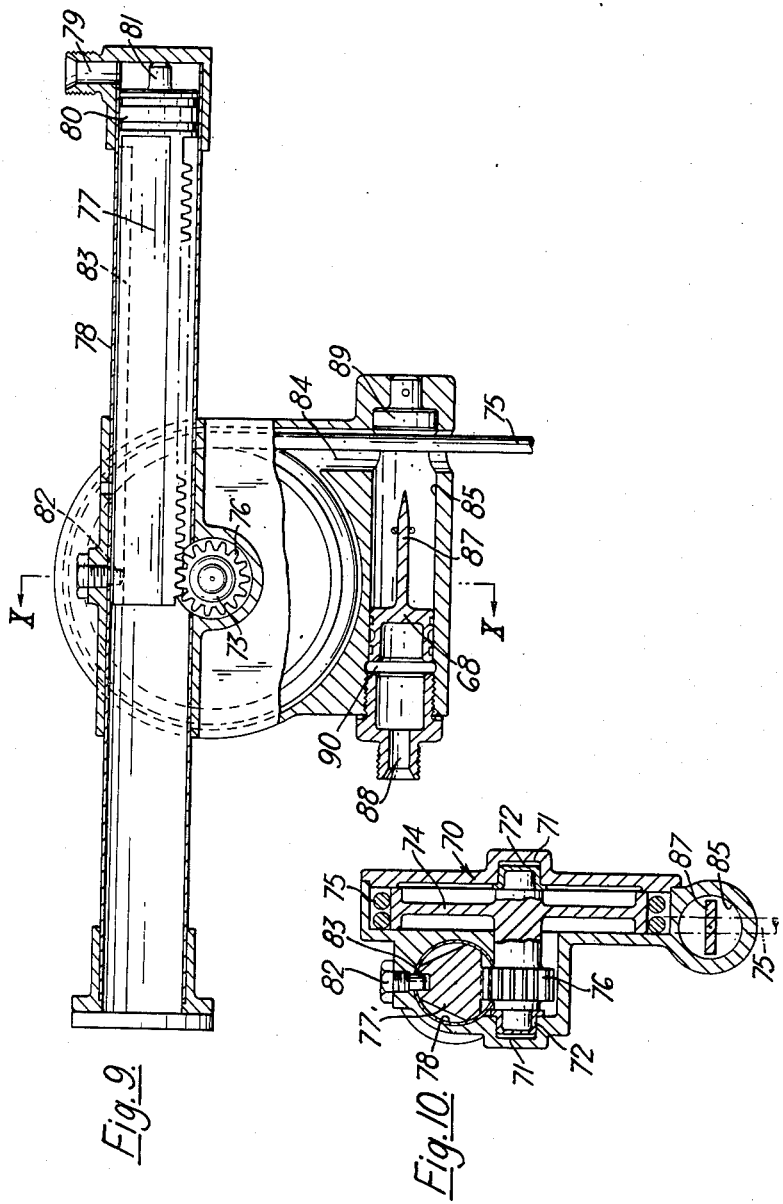
FIGURE 9 is a sectional view of a third embodiment of the invention.
FIGURE 10 is a section on the line X—X of FIGURE 9.
Figure 11:
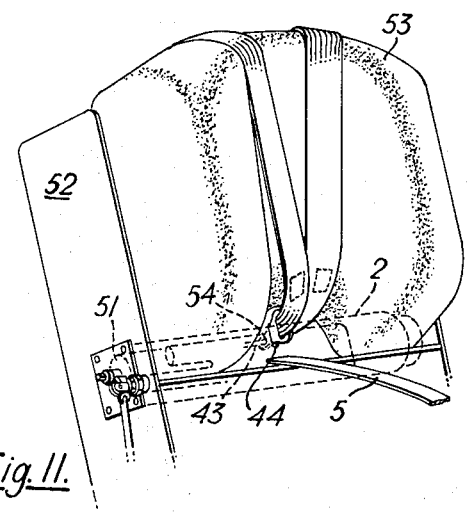
FIGURE 11 is a fragmentary perspective view of an ejection seat equipped with the apparatus shown in FIGS. 1 to 3.

In the preferred embodiment of the invention, illustrated in FIGURES 1, 2, 3, and 11 of the accompanying drawings, a head retraction mechanism 51 is secured on an ejection seat 52, adjacent the head rest 53 thereof. The mechanism comprises a tube 1 axially rotatable within a cylindrical housing 2, said tube 1 being located within the housing 2 by a pair of roller bearings 3.

The tube 1 carries a reel 4 approximately midway along its length, said reel in turn carrying a head-restraining line 5.

One end of the tube 1 is sealed by a circular plug or disc 6 having an integral central spigot 7 protruding therefrom, this spigot 7 passing into a tubular extension 8. The said plug or disc 6 is dimensioned so that it does not contact the internal surface of the tube 1 and, thus, the disc 6 may be restrained from rotation without the tube 1 being similarly restrained. The said disc 6 is restrained from rotation relatively to the extension 8 by a pin 9 passing through the tubular extension 8 and spigot 7.

The tube 1 houses a torsion spring 10, one end 11 of which is secured to the disc 6 by means of a nut and bolt 12, the other end being connected to said tube 1 by passing the spring 10 through an aperture 13 in a closure plate 14 which is fixedly secured to the tube 1. The closure plate 14 carries a series of ratchet teeth 15 on the periphery of its outer face.

The said closure plate 14 is also provided with a cylindrical protruding portion 16 which embraces locking means, to be described hereinafter, and locates a collar 17 which carries a flange 18 provided with a series of teeth which are normally forced into engagement with the teeth 15 by means of a helical compression spring 19. The collar 16 is axially movable on a hollow body 20 attached to the housing 2, but is secured against rotation relative to the body in a manner not illustrated in detail.

The torsion spring 10 is initially pre-tensioned by restraining the tube 1 from rotation with said locking means, removing the pin 9, rotating the spigot 7 with a suitable key or the like, and then replacing the said pin 9.

The said locking means is provided within the hollow body 20 which is formed with a central cylinder 21, this central cylinder serving to house a piston 22 which is adapted to be moved axially towards and away from the plate 14.

The piston 22 carries an axial projection 23 which is provided with a projection in the form of an enlarged locking part 24, square in cross-section, this locking part 24 normally being engaged in a matchingly shaped aperture in the plate 14.

The piston 22 is locked in this said position by means of a detent 25 which is biassed into a recess in the central cylinder 21 by a compression spring 26.

A second recess 27 is provided in the cylinder 21 for engagement with the detent 25 to retain said piston 22 and locking part 24 in a second position of the piston in which the locking part 24 is disengaged from said plate 14.

A further housing 28 is bolted to the cylinder 21, this further housing 28 having one end thereof provided with a screw-threaded portion 29 adapted to receive a conduit for introducing pressure fluid, for example cartridge-generated gas or pressure air, into said cylinder 21.

This preferred embodiment of restraining mechanism includes a restraining line-severing device and also means for unlocking and releasing certain straps of the airman's seat harness which retains the airman in his seat.

Thus the restraining line 5 on the reel 4 passes from the reel 4, through an aperture 30 in the housing 2 and through a line-receiving recess 30a to extend to an anchorage on the airman's helmet (not shown), a sufficient length of line being disposed between the airman's helmet and the aperture 30 to permit the airman all the head freedom he requires when flying his aircraft. The helmet used may be a normal protective helmet or a pressure helmet having a built-in oxygen mask.

The restraining line-severing device comprises a knife 31 having an oblique cutting edge 32 adapted to be moved transversely across the line-receiving recess 30a to sever the line 5. The knife 31 is riveted to a piston 33 which is adapted to ride in a cylinder 34. The piston 33 is adapted to be driven along the cylinder 34 towards the recess 30a by gas generated when required by the firing of a cartridge 35, said cartridge being ignited by a firing pin normally biassed towards the cartridge but held in its inoperative position by means of a withdrawable sear 36 passing diametrically through a bifurcated outer end portion 37 of the firing pin, the outer edge of the sear 36 engaging against a roller 38 located within the bifurcated outer end portion 37. The sear 36, which is substantially wedge-shaped, when withdrawn from the outer end portion 37 of the firing pin causes the spring biassing the pin towards the cartridge 35 to be stressed further until the sear 36 is finally withdrawn when the firing pin performs its cartridge firing action.

Normally the piston 33 is retained adjacent to the cartridge 35 by a spring-loaded detent 39.

Movement of the piston 33 towards the recess 30a uncovers a port 40 in the wall of cylinder 34 when the knife has moved some distance across the recess 30a. The port 40 communicates with a cylindrical chamber 41 housing a piston 42 which carries, on its face nearer the port 40, a locking rod 43 which extends through the end of chamber 41 and across an aperture 44. The aperture receives eyelets 54 threaded by the locking rod 43 and secured to the ends of parachute pack restraining straps 55 of the airman's seat harness, not otherwise shown.

The rod 43 and the piston 42 are biassed by a spring 45 towards a position in which rod 43 traverses said aperture 44, spring 45 being compressed between the end of the chamber 41 remote from the aperture 44 and a collar 46 on a further rod 47 carried on the face of the piston 42.

A spring-biassed plunger 48 is located in the wall of chamber 41 and normally engages the outer surface of the collar 46, the plunger being effective automatically to lock the piston 42 and rod 43 in a withdrawn position if such piston is withdrawn against the action of the spring 45 to a position where the plunger 48 may move, under the influence of its spring biassing, behind the collar 46.

A ring 49 on the end of the rod 41 externally of chamber 41 serves for manually withdrawing the collar 46 and piston 42 against the thrust of spring 45 and a knob 50 on plunger 48 serves for manually withdrawing the plunger 48, when desired, from its engaged position behind the collar 46.

The above described embodiment of restraining mechanism is particularly suitable for use on an ejection seat which is equipped with harness retraction mechanism of the construction described in my simultaneously filed, co-pending patent application Serial Number 344,613.

The above described mechanism is intended to be automatically operated during the initial stages of ejection of the seat and after the harness retraction mechanism, if provided, has withdrawn the airman into an appropriate position in the seat. Such operation is initiated by fluid pressure, for example cartridge-generated gas, being introduced into the housing 28 to cause the piston 22 to move and to disengage the locking part 24 from the plate 14, thereby permitting the tube 1 to rotate under the influence of the torque exerted thereon by the pre-tensioned torsion spring 10.

Rotation of the tube 1 causes the reel 4 to rotate and to wind-in the restraining line 5, the teeth 15 on the closure plate 14 riding over the teeth on the flange 18. The teeth 15 on the closure plate 14 normally engage the teeth on the flange 18 under the pressure of the spring 19 and prevent unwinding of the line and movement of the airman's head from its withdrawn position.

After ejection of the seat/airman combination from the aircraft, it is necessary for the airman to be separated from the seat prior to his descent by parachute.

Disconnection of the airman's pack restraining straps from the locking rod 43 in aperture 44 and the severance of the restraining line 5 are initiated by withdrawal of the sear 36 at an appropriate instant in the ejection sequence, causing the cartridge 35 to be fired. Gas under pressure generated by the cartridge causes the piston 33 to travel down the cylinder 34 causing the knife 31 to sever the line 5 in recess 30a. This movement of the piston 33 uncovers the port 40 and the gas under pressure passes through this port and acts upon the piston 42. Piston 42 is accordingly moved, against the action of the spring 45, and the rod 43 is withdrawn from its position in the aperture 44 to release the straps retained by such rod. The plunger 48 locks the rod 43 in this withdrawn position.

As has been noted, the ejection seat with which the above described apparatus is to be used is provided with a head rest against which the head of the airman is withdrawn by the operation of the apparatus in the initial stages of seat ejection. If desired, the head rest may be formed as a jettisonable unit comprising a rigid structure of horizontal U-shape, one arm of the U being positioned to lie along each side of the airman's head and the web of the U lying adjacent the seat back, the whole being suitably padded and being releasably attached to the seat by straps terminating in eye-lugs secured to the seat structure by locking pins so arranged that the head rest would be released concurrently with the severance of the line 5 and the release of parachute pack restraining straps.

A second embodiment of the retraction mechanism in accordance with the invention is shown in FIGURES 4 to 8 of the accompanying drawings. In this second embodiment, parts of the mechanism equivalent to those in the embodiment of FIGURES 1, 2 and 3 have been identified by the same reference numerals. Thus, the mechanism of FIGURES 4 to 8 comprises a tube 1 in a housing 2 rotatable on bearings 3, the tube 1 having a torsion spring 10 secured at one end to a disc 6 and at the other end to a plate 14. The tube 1 carries a reel 4 which in turn carries a restraining line 5.

In this embodiment, however, the tube 1 also has a ratchet wheel 60 fixedly secured thereto, the ratchet wheel having teeth 61 which are engaged by a pawl 62 biased by a spring 63 and normally positively retained in engagement with the teeth 61 by a barrier in the form of an axially movable piston 64 having a transverse keyhole slot generally designated 65, this slot having a narrow portion 67 and an enlarged portion 66. The piston 64 is housed within a cylinder 68 into which pressure fluid, for example cartridge-generated gas, is adapted to be introduced through a conduit connected to the threaded portion 29.

The piston 64 is biased by a spring 69 into the position shown in FIGURE 6 in which the narrow portion 66 of the slot 65 is located behind the pawl 62 so that the latter seats between a pair of teeth 61 of the ratchet wheel. The tube 1 is thus restrained by the pawl 62 from rotation about its axis in either direction.

The torsion spring 10 is suitably pretensioned. In operation, cartridge-generated gas, for example, is introduced into the cylinder 68 upon initiation of the seat ejection sequence and the piston 64 moves axially against the action of the spring 69, the enlarged portion 66 of the slot 65 moving behind the pawl so that this is freed to ride over the teeth 61 of the ratchet wheel 60 upon rotation of this, with tube 1, under the influence of the torque exerted by the pretensioned torsion spring 10, acting in an anti-clockwise direction as viewed in FIGURE 8.

Such rotation of the tube 1 causes the restraining line 5 to be reeled-in and the airman's head to be restrained, the pawl 62 remaining effective to prevent un-reeling of the line 5.

This second embodiment also includes a restraining line-serving device and arrangement for releasing the parachute pack restraining straps, of the form fully described with reference to FIGURES 1 to 3.

In a third embodiment shown in FIGURES 9 and 10, the structure of the retraction mechanism differs from that of the previously described embodiments primarily in the substitution of the torsion spring 10 by a pressure-fluid actuated motor for operating the reel carrying the restraining line.

Thus this third embodiment comprises a housing 70 including a pair of opposed cylindrical recesses 71 each lined with a plastics cup bearing 72 in which is seated an end portion of a shaft 73 having a reel 74 formed integrally therewith and carrying a head-restraining line 75.

A pinion 76 is carried by the shaft 73 and is positioned in spaced parallelism with said reel 74. This pinion is engaged by a rack 77 reciprocable in a cylinder 78 formed in the housing 70. The rack 77, which is of truncated triangular form in cross-section, is adapted to be moved axially in the cylinder 78 by means of fluid under pressure, for example, cartridge-generated gas, fed into the cylinder through a port 79, the end of said rack adjacent to the port 79 carrying a cylindrical piston member 80 fitted with an axial end stop 81 that limits approach of the piston member 80 to the end of the cylinder 78. The rack 77 is restrained from rotation about its longitudinal axis by means of a guiding stud 82, in the wall of cylinder 78, riding in a longitudinal slot 83 in the rack.

The housing 70 includes a bore 84 through which the line 75 passes from the reel 74. The housing 70 further includes a cylinder 85 which intercepts this bore 84 and houses a piston 86 carrying a knife 87.

The knife 87 is adapted to be propelled across the bore 84 to sever the line 75 by pressure fluid, for example cartridge-generated gas introduced into the cylinder 85 through a port 88 to act on piston 86. A block or pad 89 is provided in the end of cylinder 85 to receive the cutting edge of the knife 87 at the end of its stroke.

The piston 86 is located in the position shown in FIGURE 9 by a detent 90 in the piston biased into recesses in the wall of the cylinder 85. The detent 90 also ensures that a predetermined pressure must be built up on the piston 86 before the latter can move within the cylinder 85, thereby to ensure a rapid and clean cut through the line 75 when the piston is released by the detent.

In operation of this embodiment, pressure fluid, very conveniently cartridge-generated gas, is introduced into the port 79 upon the initiation of seat ejection to cause the rack 77 to move axially along the cylinder 78, thereby to rotate the pinion 76 and the reel 74 in the sense to wind-in the line 75 and cause retraction of the airman's head against the head rest of the seat. At a later stage in the ejection sequence, when disconnection of the airman from the seat is to occur, pressure fluid, again conveniently cartridge-generated gas, is introduced into the cylinder 85 through the port 88 so as to move the piston 86 and cause the knife 87 to sever the line 75.

I claim:

1. Airman's head-restraining equipment for an aircraft ejection seat including a head rest, comprising: a retraction mechanism adapted to be mounted on the seat; a flexible member adapted to connect said mechanism to the head of an airman in said seat; said retraction mechanism being operative to apply tension to said flexible member to draw the airman's head against said head rest; disabling means operative subsequently to operation of said retraction mechanism for disabling the connection between the retraction mechanism and the seat occupant's head; and unlocking means responsive to the disabling of said connection by said disabling means for unlocking a parachute pack restraining strap locking device.

2. Equipment as set forth in claim 1, wherein said locking device includes a rod, said unlocking means include a cylinder, and a piston movable in said cylinder and connected to said rod for joint movement, and said disabling means include a pressure-fluid operated actuator and conduit means connecting said actuator to said cylinder for transmitting pressure fluid from said actuator to said cylinder after the disabling of said connection, and for thereby moving said rod.

References Cited by the Examiner

UNITED STATES PATENTS

| 2,480,335 | 8/49 | Nordmark | 244—122 |
| 2,527,020 | 10/50 | Martin | 244—122 |
| 2,547,777 | 4/51 | Ray | 242—107.4 |
| 2,638,293 | 5/53 | Lindstrom | 244—122 |
| 2,755,550 | 7/56 | Benjamin | 244—122.5 |
| 2,883,123 | 4/59 | Finnigan | 244—122 |
| 2,971,730 | 2/61 | Martin | 244—122 |
| 3,036,798 | 5/62 | Martin | 244—141 |

FERGUS S. MIDDLETON, *Primary Examiner.*